(12) United States Patent
Yang

(10) Patent No.: US 8,294,372 B2
(45) Date of Patent: Oct. 23, 2012

(54) ONLINE TIME DIMMER

(75) Inventor: Wen-Ho Yang, Taipei County (TW)

(73) Assignee: Sun-Lite Sockets Industry, Inc., Taoyuan (TW)

( * ) Notice: Subject to any disclaimer, the term of this patent is extended or adjusted under 35 U.S.C. 154(b) by 727 days.

(21) Appl. No.: 12/461,888

(22) Filed: Aug. 27, 2009

(65) Prior Publication Data

US 2011/0050106 A1 Mar. 3, 2011

(51) Int. Cl.
*H01J 1/60* (2006.01)
(52) U.S. Cl. .................... 315/133; 315/360; 323/905
(58) Field of Classification Search ............. 315/133, 315/136, 291, 360; 307/139, 140, 141; 323/905
See application file for complete search history.

(56) References Cited

U.S. PATENT DOCUMENTS

| | | | | |
|---|---|---|---|---|
| 3,748,532 A * | 7/1973 | Rosenbaum | ............... | 315/362 |
| 4,668,876 A * | 5/1987 | Skarman | ............... | 307/116 |
| 6,005,210 A * | 12/1999 | Chien | ............... | 200/438 |
| 6,124,674 A * | 9/2000 | Wan | ............... | 315/76 |
| 6,255,613 B1 * | 7/2001 | Yang | ............... | 200/553 |
| 6,566,819 B2 * | 5/2003 | Wolff | ............... | 315/149 |
| 6,815,625 B1 * | 11/2004 | Leopold et al. | ............... | 200/296 |
| 6,980,122 B2 * | 12/2005 | Novikov | ............... | 340/12.32 |
| 2002/0153780 A1 * | 10/2002 | Wolff | ............... | 307/116 |

* cited by examiner

*Primary Examiner* — Thuy Vinh Tran
(74) *Attorney, Agent, or Firm* — Bacon & Thomas, PLLC

(57) ABSTRACT

An online time dimmer is disclosed, which comprises a base, an electric circuit unit lodged in the base and a top cover joined with the base correspondingly. The electric circuit unit is functionally made up of a dimmer circuit and a time circuit, and structurally comprises a power switch and a time switch, which are activated by a switch button and a time button respectively. When in use, one end of the unit connects electrically to a power supply through electric wires and a plug, while the other end to a lighting load through electric wires. Once depressing the switch button will in turn press the power switch, which activates power-on, power-off and the adjustment of brightness operated on the lighting load through the dimmer circuit. And depressing the time button will in turn press the time switch, which enables the time circuit to operate time setting on the lighting load.

5 Claims, 6 Drawing Sheets

ONLINE TIME DIMMER

BACKGROUND OF THE INVENTION

1. Field of the Invention

This invention relates generally to an online time dimmer and more specifically to one featuring adjustment of illumination and setting of time that could economize on electric energy.

2. Description of the Prior Art

A dimmer features the adjustment of the luminance of a lighting load. Prior art dimmers make use of a handler (for instance: knob) explicitly set up on the shell to adjust resistance of an internal variable resistor, which in turn controls the adjustment of the luminance of a lighting load. However, the prior art dimmers feature merely the adjustment of the luminance. Once the luminance is adjusted to certain brightness, the brightness is kept unchanged and also not possible to be extinguished automatically. This single feature will disable the versatility of the use in some occasions. A common scenario, for instance: some people make use of full brightness of a lighting load to peruse a magazine before sleeping, dim brightness at the moment of falling into a sleep, and no luminance at all about one or two hours after sleeping. There is no need for any lighting for being fast asleep (many people are always used to the darkness for a sudden waking). And a further expectation is for saving electricity. Actually, quite many are already asleep before adjusting the light into dim brightness, where this group of people deadly calls for the dimmer with automatic extinguishment for saving electric energy. Besides, some like to keep indoor lights lightened (full brightness or half brightness) when they are absent, and they desire that the light will completely be extinguished for some hours later on, which could pretend a false impression that someone is in the room. However, the demands of the aforementioned scenarios are not satisfied with the current prior art dimmers featuring merely adjusting luminance. During extensive depression of economy and an upsurge of environmental protection, people extremely care about energy saving for the use of electric appliances. A dimmer featuring not only adjustment of luminance but setting of time and conforming to the demands of various circumstances and energy saving is the ideal of this invention.

SUMMARY OF THE INVENTION

In the light of the aforesaid demands, the present inventor conceived the idea through research and development, and eventually the longtime endeavors gave birth to this invention.

The objective of this invention is to provide a dimmer that features adjustment of brightness and setting of time that could economize on electricity.

To achieve aforesaid objects, this invention provides an online time dimmer, where its one end connects electrically to an electric power supply through electric wires and a plug, while the other end to a lighting load through electric wires, comprising a base, an electric circuit unit lodged in the base and a top cover joined with the base correspondingly. The base is provided with a through hole near each of two ends for the insertion by a fastener. The electric circuit unit comprises a circuit board and electric components set up thereon, where the circuit board connects electrically to the aforesaid electric wires at its two ends. The electric circuit unit is functionally made up of a dimmer circuit and a time circuit, and structurally comprises a power switch and a time switch. The top cover is provided with screw holes internally at the locations corresponding to the through holes of the base, for the threaded joining with the fasteners, and has two openings on its surface which accommodates a switch button and a time button respectively, where the bottom of the buttons is in contact with the power switch or the time switch. When in use, depressing the switch button will in turn press the power switch, which activates power-on, power-off and the adjustment of brightness operated on the lighting load through the dimmer circuit. And depressing the time button will in turn press the time switch, which enables the time circuit to operate time setting on the lighting load.

In the aforesaid invention, the electric circuit unit structurally further comprises multiple lightened indicators to display the status of the power-on, power-off and time setting respectively.

In the aforesaid invention, the lightened indicators further comprise a power indicator to display the power on/off states, and multiple time indicators to display different time setting states.

In the aforesaid invention, the dimmer circuit features recovery for its adjustment on brightness, which means each time the switch button is depressed to power on, the load power is recovered to its maximum value.

In the aforesaid invention, the time circuit features memory for its time setting. During power being unceasingly supplied, the time circuit will recall the time setting before the previous power-off.

DETAILED DESCRIPTION OF THE INVENTION

Figure 1:
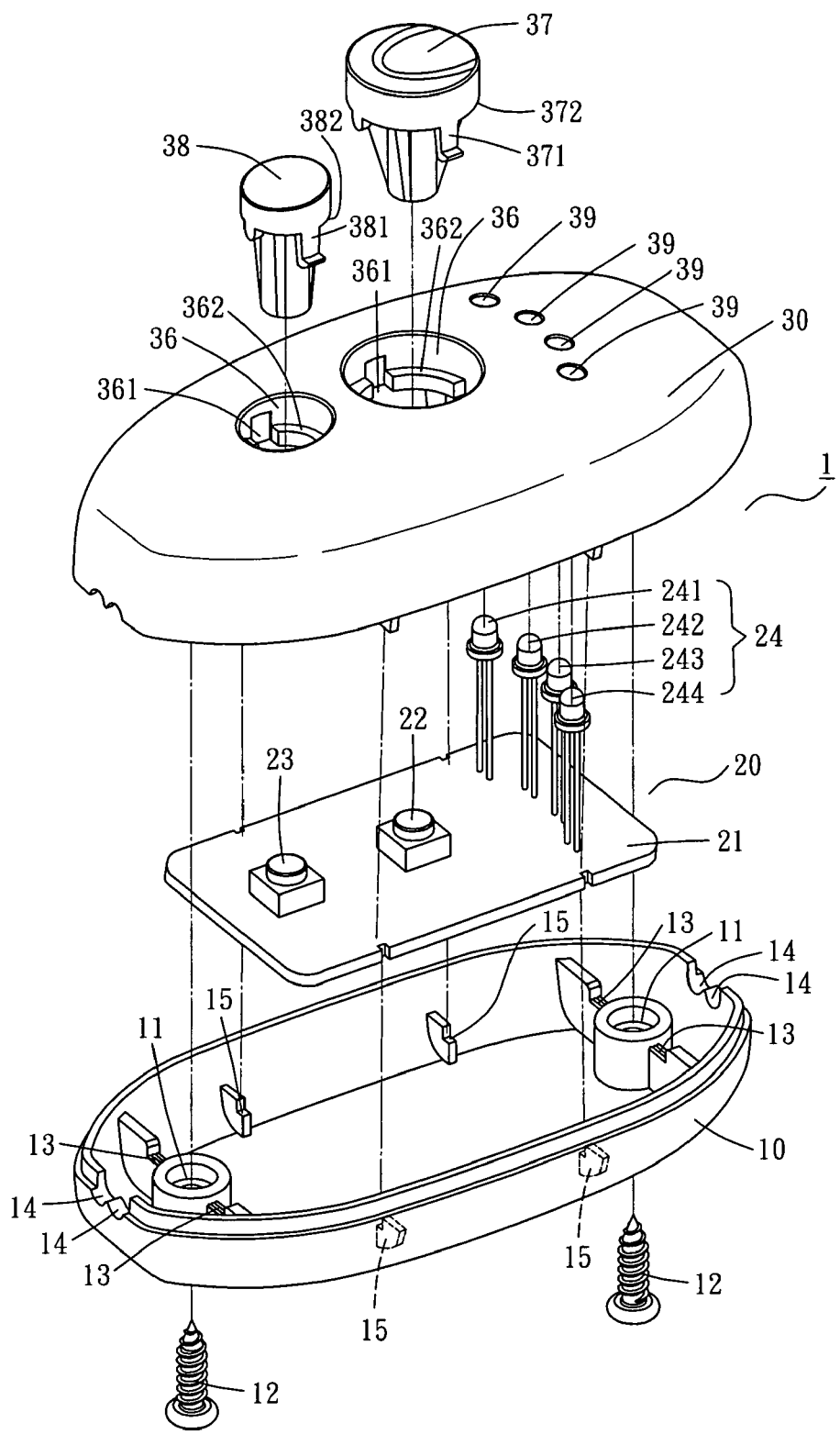
FIG. 1 is a three-dimensional exploded view of the structure of the embodiment of this invention.

To achieve the aforesaid objects of the present invention, the technique adopted and the function achieved are detailed described with reference to the following preferred embodiments and the accompanying drawings, which would give a thorough comprehension on the present invention.

Referring to FIGS. 1-5, the embodiment of this invention is an online time dimmer 1, where its one end connects electrically to a power supply through electric wires 26 and a plug 261, while the other end to a lamp holder 27 (lighting load) through electric wires 25. The online time dimmer 1 comprises a base 10, an electric circuit unit 20 lodged in the base 10 and a top cover 30 joined with the base 10 correspondingly. The base 10 is provided with a through hole 11 near each of two ends, for the insertion by a fastener 12 (for instance: a bolt) from the bottom. And a bearing notch 13 is set up at each side of the through hole 11. A set of semicircle indented bores 14 on the side wall farther to each through hole 11 is reserved for the penetration by the wires 25, 26 during the assembly (shown in FIG. 4). And a number of bearing notches 15 are set up on the inner side of the side wall for the support of the electric circuit unit 20.

Figure 6:
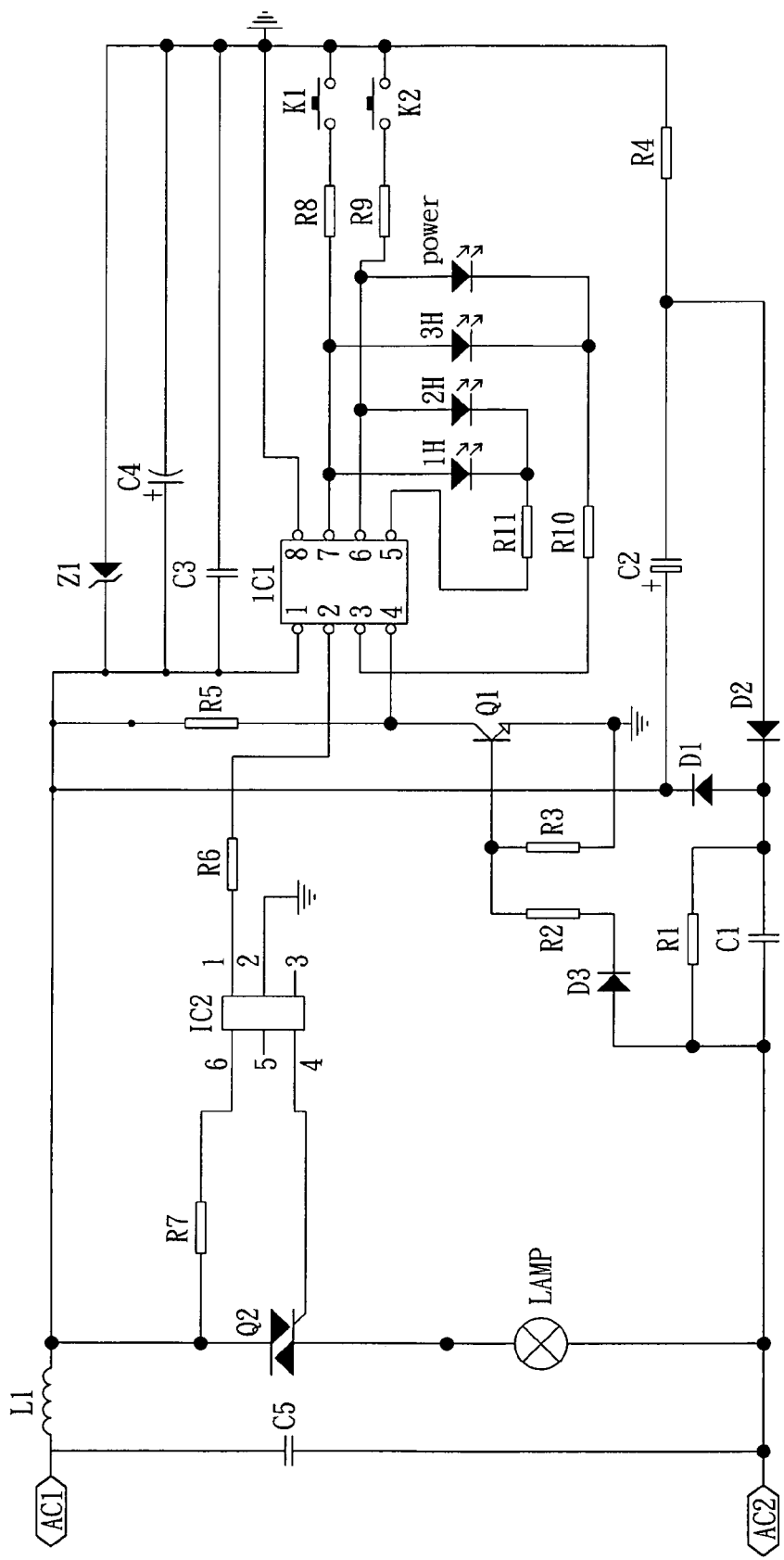
FIG. 6 is an electric circuit diagram of the embodiment of this invention.

The electric circuit unit 20 is made up of a number of electric components implanted on a circuit board 21, and the electric circuit connection of these components constitutes the circuit diagram in FIG. 6, where the circuit unit is functionally made up of a dimmer circuit and a time circuit, and comprises structurally a power switch 22, a time switch 23 and plural lightened indicators 24. The plural lightened indicators 24 are made up of a power indicator 241 and three time indicators 242, 243, 244, which display the span of the setting time; for instance, representing 1 H (hour), 2 H, 3 H respectively. The circuit board 21 connects electrically to the wires 25, 26 with its two ends. During the assembly shown in FIGS. 4 & 5, the circuit board 21 of the electric circuit unit 20 is lodged in the base 10 and located among the bearing notches 15, and between the two through holes 11, followed by laying the wires 25, 26 right on the bearing notches 13 and the indented bores 14, and finally the wires are extended outward.

Figure 2:
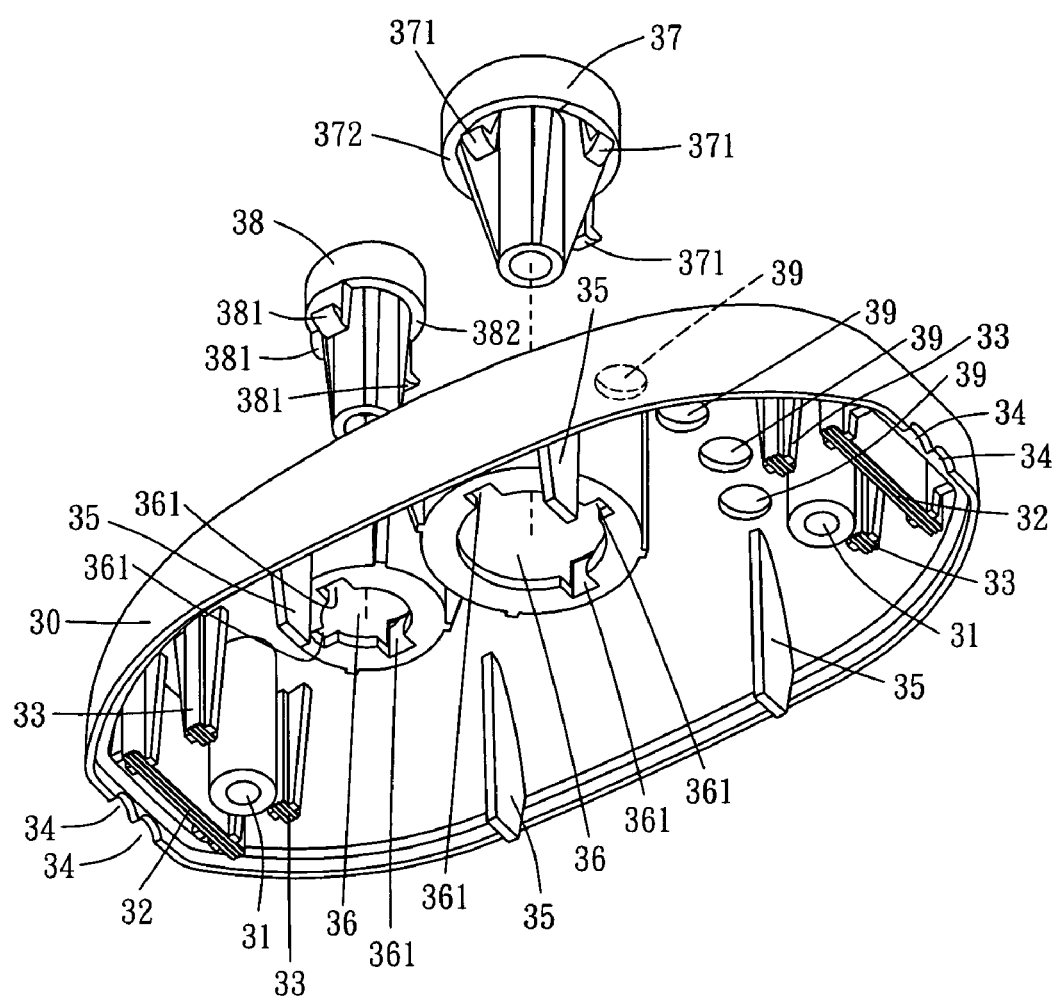
FIG. 2 is a three-dimensional bottom view of the top cover of the embodiment of this invention.
Figure 3:
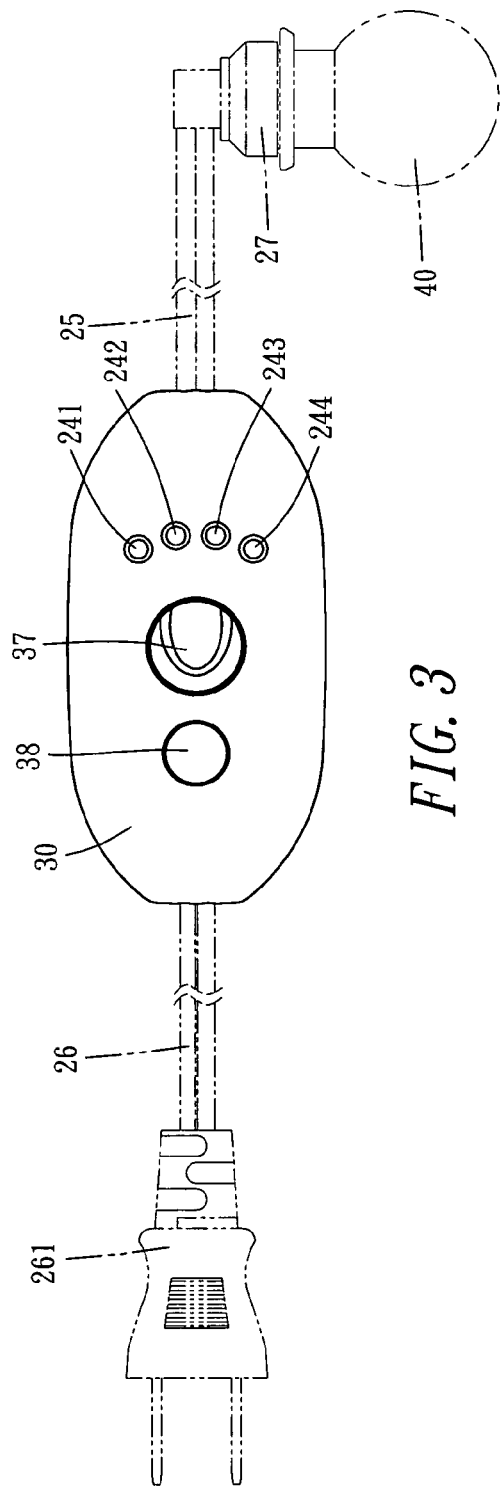
FIG. 3 is a schematic top view of the use of the embodiment of this invention.
Figure 4:
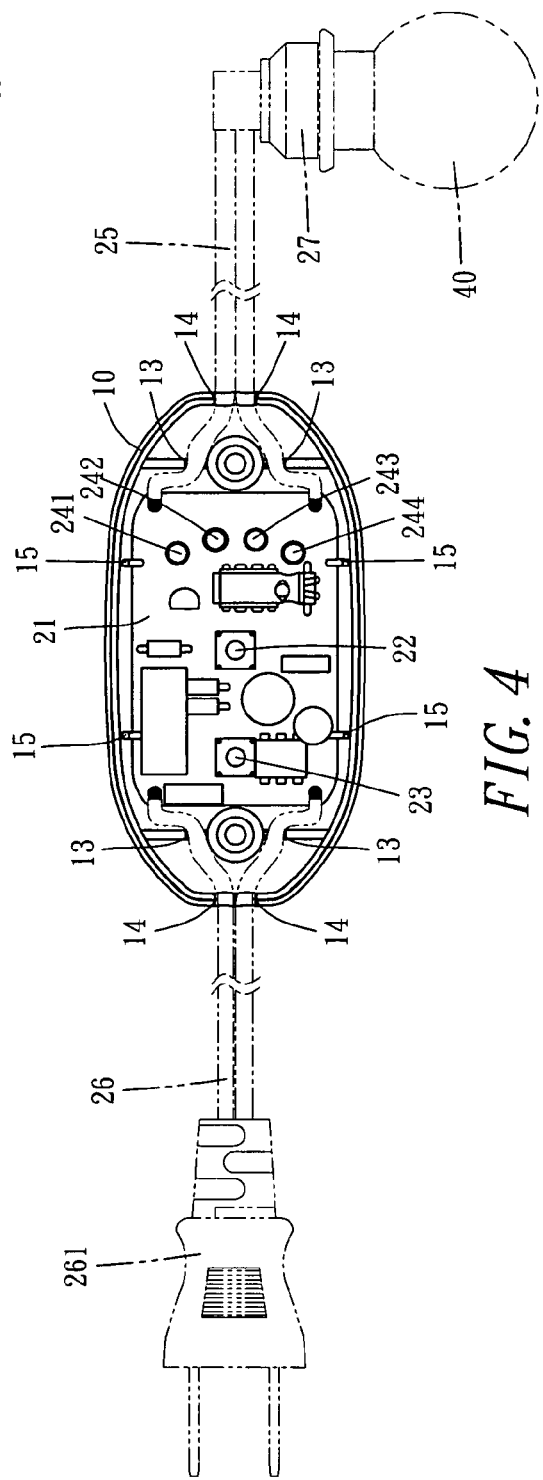
FIG. 4 is a schematic view of the internal combination of the embodiment of this invention.
Figure 5:
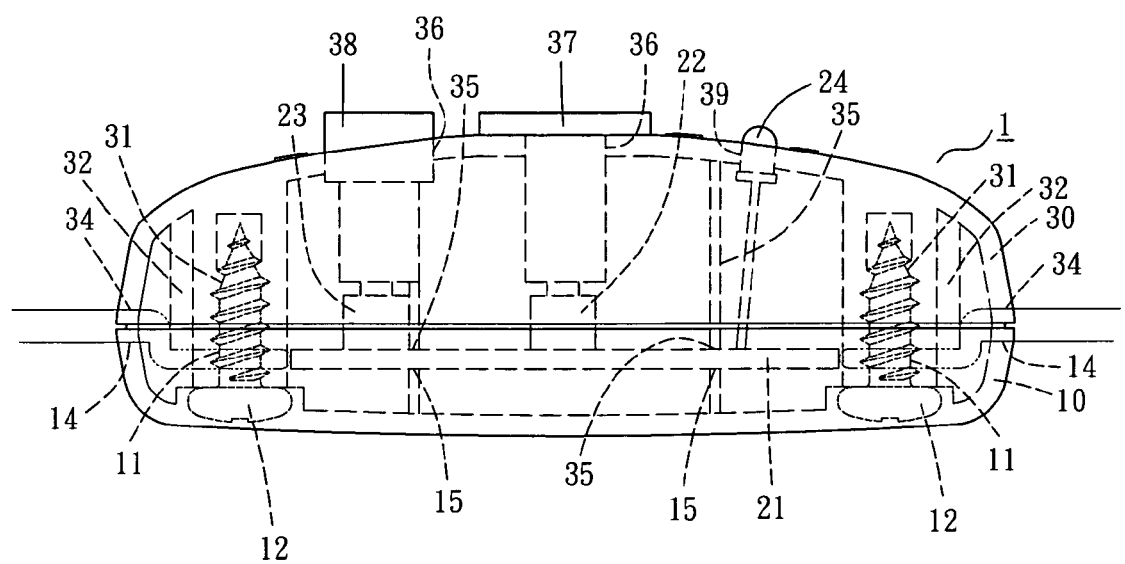
FIG. 5 is a schematic side view of the combination of the embodiment of this invention.
Figure 7:
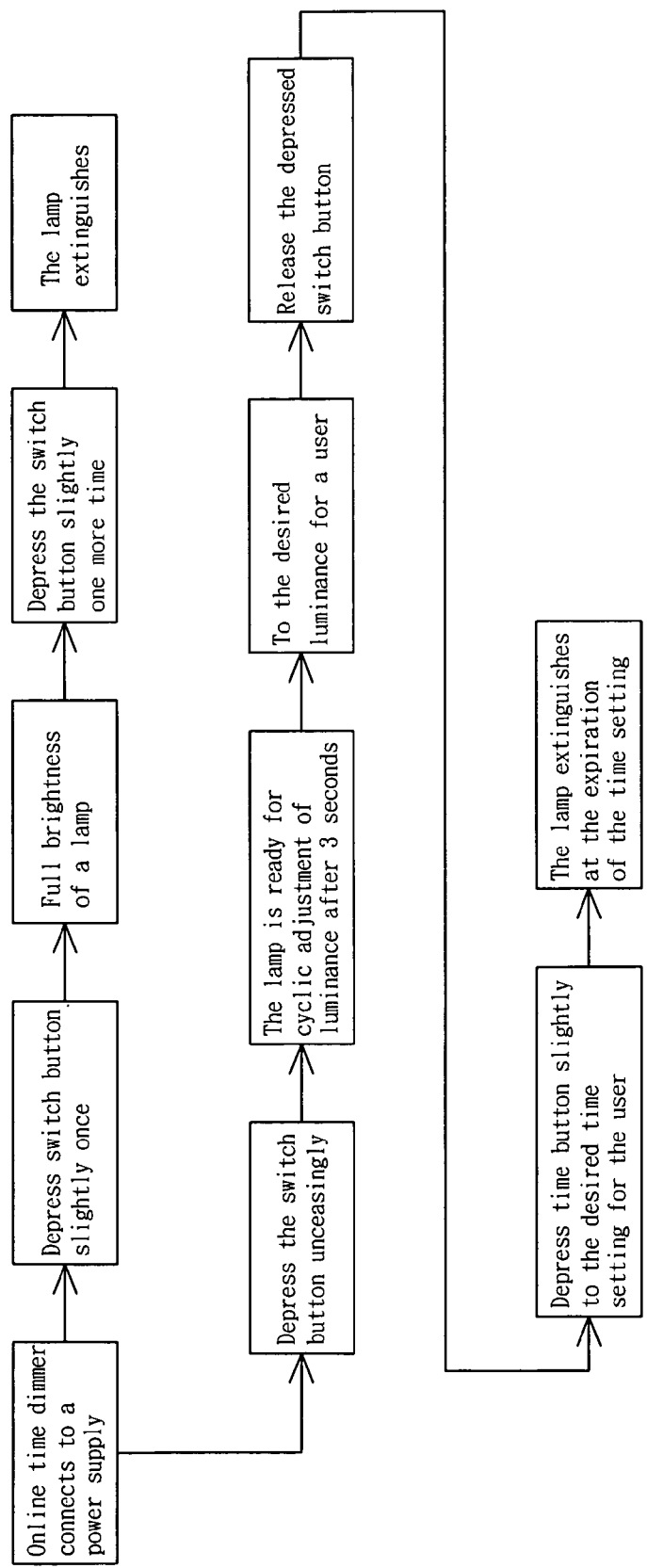
FIG. 7 is a flow chart of the use of the embodiment of this invention.

Referring to FIG. 2, the top cover 30 is provided with screw holes 31, pressing rods 33, indented bores 34 and pressing ribs 35 at its bottom (interior) corresponding to the locations of the through holes 11, bearing notches 13, indented bores 14 and bearing slits 15 of the base 10. And a pressing board 32 is formed in the space between the pressing rod 33 and the indented bore 34, which enables the bearing slits 15 and pressing ribs 35 together to clip the circuit board 21 of the electric circuit unit 20 when the side walls of the top cover 30 and the base 10 are joined correspondingly. The wires 25, 26 at two ends clipped by the bearing notches 13 and the pressing rods 33 extend outward through the bottom of the pressing board 32 and stretch consecutively two turns, upward and outward, to pass the indented bores 14, 34 for the outbound extension. The aforesaid fastener 12 (for instance: a bolt) inserted from the bottom of the through hole 11 is in threaded connection with the screw hole 31 of the top cover 30. The top cover 30 is provided with two openings 36 on its surface, where each opening 36 forms a pointing block 362 at certain depth inward and multiple (for instance: three) pointing troughs 361 on top of the pointing block. The openings 36 are inserted by a switch button 37 and a time button 38 respectively, where the buttons 37, 38 each is formed into multiple (for instance: three) seizing hooks 371, or 381 at its lateral corresponding to the pointing troughs 361, and a limiting ring 372, or 382 of bigger diameter on top of the seizing hook 371, or 381 corresponding to the pointing blocks 362. In the assembly, the buttons 37, 38 each is inserted into its corresponding opening 36, followed by moving the seizing hook 371, or 381 down along its corresponding pointing trough 361 with a depressing to clip the seizing hook 371, or 381 to the pointing trough 361. And the bottom of the button 37 or 38 touches the top of the power switch 22 or the time switch 23 respectively. But the limiting ring 372, or 382 and its corresponding pointing block 362 are kept for a certain distance in between. The top cover 30 is provided with multiple through holes 39 on one side of its surface, where multiple lightened indicators 24 appear at the through holes 39 from inside for the fixing (shown in FIGS. 3 & 5). As the aforementioned structure of this invention is assembled, electric power is connected from the power supply by a plug 261 and is passed through the wires 26 to the electric circuit unit 20, which enables the activation of the dimmer circuit and the time circuit on the electric circuit unit 20. The electricity is further connected through the wires 25 to the lamp holder 27, and the lamp 40 (lighting load) attached to the lamp holder 27 is powered. And the lamp 40 is also adjusted and controlled by the dimmer circuit and the time circuit. FIG. 7 shows the flow chart of the use of this invention for the purpose of the adjustment and control. The operational steps are as follows:

1.) Depressing the switch button 37 slightly once means that the switch button 37 presses the power switch 22 slightly once, and the online time dimmer 1 is then ready to supply electric power to the lamp 40, for the purpose of lightening the lamp 40. At the moment, the load power is maximized and the brightness of the lamp is maximized too, and the power indicator 241 is lightened, which signals the user that the online time dimmer 1 is supplying power to the lamp 40. Depressing the switch button 37 slightly one more time means that the switch button 37 presses the power switch 22 slightly one more time, and the online time dimmer 1 is then ready to disconnect power to the lamp 40, for the purpose of putting out the lamp 40 (no load power). At the moment, the power indicator 241 is extinguished, which signals the user that the online time dimmer 1 is disconnected to the lamp 40.

2.) Once a user intends to adjust brightness to the lamp 40, provided that the online time dimmer 1 is under the power connection. By depressing the switch button 37 unceasingly, the switch button 37 will press the power switch 22 unceasingly, and the dimmer circuit will be activated to work about three minutes later, which makes the brightness of the lamp 40 to be changed (variation boundary: 0~100% rated power, where 0% means no brightness at all and 100% is the maximum of brightness). The variation of the lamp 40 is from full brightness through dim brightness until complete darkness and reversely from the complete darkness back to the full brightness. And the change is cyclic (provided that the unceasingly depressing the switch button 37). When the brightness of the lamp 40 reaches its maximum (100% of its load power), the lamp 40 will glitter once, which signals the user that the load power (brightness) has reached its maximum.

3.) As the brightness of the lamp 40 is under the cyclic changing, the user can select the desired luminance just by releasing the depressing on the switch button 37 once the luminance of the lamp is recognized, that is, the release of the switch button 37 will release the power switch 22. And the lamp 40 will stay in that luminance.

4.) Once the lamp 40 is adjusted to the desired luminance and the user demands a time setting (the most obvious example is the aforementioned one that the user adjusted the lamp 40 into dim luminance to be ready for sleeping; meanwhile, an extinguishment is desired for a couple of hours later), a slight depressing on the time button 38 once, which means to depress slightly the time switch 23 once by the time button 38, and a one-hour time setting is being accomplished. The time indicator 242 is also lightened, which signals the user that a one-hour setting is timed. If the time button 38 is being slightly depressed twice consecutively, which is to depress the time switch 23 twice by the time button 38, and a two-hour time setting is accomplished. Another time indicator 243 is lightened (meaning the time indicators 242, 243 are both lightened), which signals the user that a two-hour setting is timed. If the time button 38 is being slightly depressed three times consecutively, which is to depress the time switch 23 three times by the time button 38, and a three-hour time setting is accomplished. The other time indicator 244 is lightened (meaning the time indicators 242, 243 and 244 are all lightened), which signals the user that a three-hour setting is timed. However, after one hour, the longer time setting indicator, the indicator 244 or the indicator 243 is being extinguished. And the online time dimmer 1 is disconnected when the time setting expires, which disables the lightening of the lamp 40 and all the lighting indicators 24.

5.) When the time button 38 is depressed to have the time setting ready, each press represents a one-hour setting is timed and is allowed for accumulation. But once the maximum of the setting number (three-hour time setting for this invention, that is, three presses) is reached, one more press (the fourth time pressing) will reset the time setting to zero; meanwhile, all the time indicators 242, 243 and 244 are extinguished. However, one more press will start to set the time setting, which means the steps of time setting in this invention is as follows: 1 hr→2 hrs→3 hrs→reset to zero→1 hr→2 hrs→3 hrs→reset to zero - - - , going on in such a cyclic manner.

6.) The dimmer circuit of the online time dimmer 1 of this invention features recovery for its brightness adjustment, which means each time to depress the switch button 37 to power on, the load power reset to its maximum value (the rated power is 100% and the lamp 40 is in the full brightness), and tuning is then proceeded for the desired luminance.

7.) The time circuit of the online time dimmer 1 of this invention features memory for its time setting. Once the plug 261 is kept in plugging to the power supply (the electric power is kept to supply, even for system power-off), the time circuit will memorize the previous (before power-off) time setting. For instance, a one-hour is the value for the previous time setting, and the switch button 37 is depressed before the expiration of the time setting. Once the switch button 37 is depressed for a later time, the time circuit of the online time dimmer 1 of this invention will memorize the previous (before power-off) value (1 hour) of the time setting and execute it.

8.) When the switch button 37 and the time button 38 are depressed in an ordinary way, their limiting rings 372, 382 are barricaded by the pointing blocks 362 of the openings 36 respectively, for the prevention of damage by the excessive pressing on the power switch 22 and the time switch 23, where the pointing block 362 features a restriction in limiting the excessive depressing of the switch button 37 and the time button 38.

In conclusion, the present invention indeed accomplishes expected objective and function, and the disclosure of its structural combination has not opened to the public, which is construed to be valid for a patent; however, the aforesaid exemplified embodiments of the present invention are used only for the illustration, not for the constraint of the scope; any equivalent embodiments or modifications without departing from the spirit and scope of the present invention are therefore intended to be embraced.

What is claimed is:

1. An online time dimmer, having its one end connected electrically to a power supply through electric wiring and a plug, while the other end to a lighting load through electric wiring, comprising a base, an electric circuit unit lodged in said base and a top cover joined with said base correspondingly, wherein said base is provided with a through hole near each of two ends for the insertion by a fastener; said electric circuit unit comprising a circuit board and electric components set up thereon, where the circuit board connects electrically to the aforesaid electric wiring at its two ends, said electric circuit unit being functionally made up of a dimmer circuit and a time circuit, and structurally comprising a power switch and a time switch; said top cover being provided with screw holes internally at the locations corresponding to the through holes of said base for threaded joining with the fasteners, and having two openings on its surface which accommodates a switch button and a time button respectively, where the bottom of the buttons is in contact with the power switch or the time switch; when in use, depressing the switch button in turn pressing the power switch, which activates power-on, power-off and the adjustment of brightness operated on the lighting load through the dimmer circuit; and depressing the time button in turn pressing the time switch, which enables the time circuit to operate time setting on the lighting load.

2. An online time dimmer as in claim 1 wherein said electric circuit unit structurally further comprises a plurality of lightened indicators to display the status of the power-on, power-off and time setting respectively.

3. An online time dimmer as in claim 2 wherein the lightened indicators are made up of a power indicator to display the power on/off states, and further including a plurality of time indicators to display different time setting states.

4. An online time dimmer as in claim 1 wherein the dimmer circuit features recovery for its adjustment on brightness, which means each time the switch button is depressed to power on, the load power being recovered to its maximum value.

5. An online time dimmer as in claim 1 wherein the time circuit features memory for its time setting, and once power being unceasingly supplied, the time circuit recalling the time setting before the previous power-off.

* * * * *